(No Model.)

A. M. GRAVES.
GLASS LINED METAL CAN.

No. 274,934. Patented Apr. 3, 1883.

Attest
Charles H. Pell
F. F. Campbell.

Inventor:
Anna M. Graves
by O. Drake, Atty.

UNITED STATES PATENT OFFICE.

ANNA M. GRAVES, OF NEWARK, NEW JERSEY.

GLASS-LINED METAL CAN.

SPECIFICATION forming part of Letters Patent No. 274,934, dated April 3, 1883.

Application filed December 4, 1882. (No model.)

*To all whom it may concern:*

Be it known that I, ANNA M. GRAVES, a citizen of the United States, residing at Newark, in the county of Essex and State of New Jersey, have invented certain new and useful Improvements in Glass-Lined Metal Cans and other Vessels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of hermetically sealing the covers of vessels of this character; also, of removing the outer or metal cover, and to avoid as much as possible permanent injury either to the metal or glass portion of the vessel by the removal of the cover or covers.

The invention consists in forming a recess or an annular space at the top of the vessel, between the outer or metal portion and the inner or glass portion thereof, and other peculiar features of construction, as will be hereinafter set forth, and finally embodied in the claim.

Figure 1:
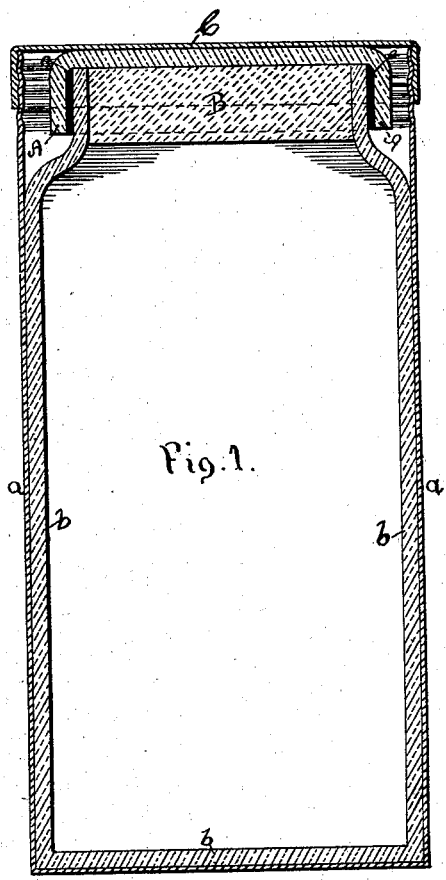
Figure 2:
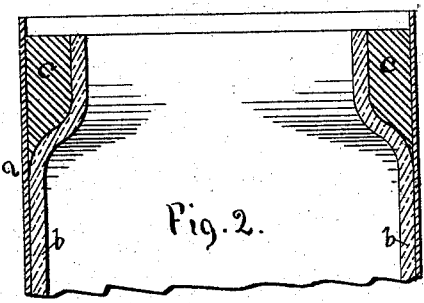

In the drawings, in which similar letters of reference indicate corresponding parts in each of the figures, Figure 1 represents a vertical transverse section of a can or vessel embodying my improvements; and Fig. 2, a similar section, representing the upper portion of the same with the outer and inner covers removed.

In carrying out my invention the metal portion $a$ of the vessel may be constructed by any of the ordinary processes and of any desired shape or form, after which the glass portion $b$ may be blown in or otherwise inserted so as to form a lining thereto entirely of glass, as indicated in the drawings. In order to have the mouth or neck of the glass portion smaller than the metal or outside portion, as shown, an inwardly-projecting removable ring or rim, as $c$, should be snugly fitted around the inside of the metal part at the top before the glass is blown in, shaped to conform to the shape desired to be given to the neck of the glass part, as indicated in Fig. 2. After the glass has been blown in, the metal ring or rim may be removed, leaving a corresponding open or annular space between the glass and the metal, thus facilitating the adjustment or removal of the glass cover A and metal cover C, as indicated in Fig. 1.

Provision is made for hermetically sealing the vessel by the insertion of a cork, B, or other elastic stopper, or by an elastic packing, $e$, or both, inserted between the cover and the neck of the vessel, either at the sides, as indicated in Fig. 1, or at the top, as may be preferred, or by a metal cover, C, which may be soldered on in the usual manner; or, when it is desired to use the vessel more than once or permanently, it may be secured by a bayonet-joint, as will be understood, or by being screwed on, in which latter case, when sheet metal is used, the screw-threads may be stamped or pressed into the metal, as indicated in Fig. 1, so that the cover may be readily removed without injury to the latter or to the vessel. The metal cover can, however, when it is soldered on, be easily and safely removed without permanent injury to the vessel by cutting through it where the annular space is, and the vessel be used again by soldering on another in its place, as will be manifest.

In many cases the glass, instead of being blown in, may be fitted snugly in or cemented to the metal, or be secured or held in position in any appropriate manner or by any suitable means, so long as an annular space is left between the inside and outside portions, as above described.

Having thus described my invention, what I claim, and wish to have secured by Letters Patent, is—

As an improved article of manufacture, a can or vessel composed of metal on the outside and glass or its equivalent on the inside, and having an annular space at the top between said inner and outer portions, as described, for the purposes set forth.

In testimony that I claim the foregoing I have hereunto set my hand this 18th day of November, 1882.

ANNA M. GRAVES.

Witnesses:
 OLIVER DRAKE,
 CHARLES H. PELL.